(12) United States Patent
Katayama et al.

(10) Patent No.: US 10,309,446 B2
(45) Date of Patent: Jun. 4, 2019

(54) CONNECTING SHAFT AND MANUFACTURING METHOD OF CONNECTING SHAFT

(71) Applicant: Honda Motor Co., Ltd., Tokyo (JP)

(72) Inventors: Yuji Katayama, Wako (JP); Yasuhiko Saijo, Wako (JP); Hiroaki Kikuchi, Wako (JP); Hong Bie, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 123 days.

(21) Appl. No.: 15/425,970

(22) Filed: Feb. 6, 2017

(65) Prior Publication Data

US 2017/0227045 A1 Aug. 10, 2017

(30) Foreign Application Priority Data

Feb. 10, 2016 (JP) .................. 2016-023599

(51) Int. Cl.
| | |
|---|---|
| *F16C 3/02* | (2006.01) |
| *F16D 1/027* | (2006.01) |
| *B29C 65/48* | (2006.01) |
| *B29C 65/00* | (2006.01) |
| *F16D 1/108* | (2006.01) |

(Continued)

(52) U.S. Cl.
CPC .............. *F16C 3/023* (2013.01); *B29C 65/48* (2013.01); *B29C 66/12441* (2013.01); *B29C 66/12469* (2013.01); *B29C 66/3262* (2013.01); *B29C 66/5221* (2013.01); *B29C 66/721* (2013.01); *B29C 66/7394* (2013.01); *B29C 66/742* (2013.01); *F16C 3/026* (2013.01); *F16D 1/027* (2013.01); *F16D 1/108* (2013.01);

(Continued)

(58) Field of Classification Search
CPC . B29C 65/48; B29C 66/124; B29C 66/12441; B29C 66/12469; B29C 66/3262; B29C 66/5221; B29C 66/721; B29C 66/7394; B29C 66/742; B29C 66/7212; F16C 3/023; F16C 3/026; F16D 1/027; B29K 2705/00; B29L 2031/75
USPC ........ 403/359.1, 359.5, 359.6, 383; 464/181, 464/182, 183
See application file for complete search history.

(56) References Cited

U.S. PATENT DOCUMENTS 4,238,539 A * 12/1980 Yates ...................... B29C 70/32
156/172
4,451,245 A * 5/1984 Hornig .................... F16C 3/026
29/432

(Continued)

FOREIGN PATENT DOCUMENTS

| | | |
|---|---|---|
| CN | 102027279 A | 4/2011 |
| CN | 104804657 A | 7/2015 |
| JP | 2014222069 | 11/2014 |

*Primary Examiner* — Amber R Anderson
*Assistant Examiner* — Nahid Amiri
(74) *Attorney, Agent, or Firm* — Duft & Bornsen, PC (57) ABSTRACT

A connecting shaft including a first shaft made of metal, a second shaft made of resin, and a collar made of metal including a first fitting portion fitting on an outer peripheral surface of the first shaft and a second fitting portion fitting on an outer peripheral surface of the second shaft. A gap between the outer peripheral surface of the second shaft and an inner peripheral surface of the second fitting portion is filled with an adhesive agent, and the adhesive agent is applied to an outer peripheral surface of the collar to cover an end face of the second fitting portion in an axial direction.

6 Claims, 11 Drawing Sheets

(51) Int. Cl.
*B29L 31/00* (2006.01)
*F16D 1/10* (2006.01)

(52) U.S. Cl.
CPC ....... *B29C 66/7212* (2013.01); *B29L 2031/75* (2013.01); *F16D 2001/103* (2013.01)

(56) References Cited

U.S. PATENT DOCUMENTS

| | | | | |
|---|---|---|---|---|
| 5,230,661 A * | 7/1993 | Schreiber | ................ | F16C 3/026 403/275 |
| 5,299,981 A * | 4/1994 | Poulin | .................... | F16C 3/026 464/111 |
| 5,309,620 A * | 5/1994 | Shinohara | ........... | B29C 65/5057 29/432 |
| 5,421,781 A * | 6/1995 | Mackellar | ........... | B29C 66/5221 285/403 |
| 7,140,800 B2 * | 11/2006 | Sugiyama | ............... | F16C 3/026 403/266 |
| 7,427,237 B2 * | 9/2008 | Burkett | .................... | F16C 3/026 464/181 |
| 7,650,818 B2 * | 1/2010 | Inoue | .................... | B60B 27/023 464/181 |
| 8,419,887 B2 * | 4/2013 | Kennedy | .................... | F16C 7/02 156/158 |
| 8,597,131 B2 * | 12/2013 | Pisinger | .................... | F16D 3/387 156/60 |
| 8,876,614 B2 * | 11/2014 | Nakamura | ............... | F16C 3/026 464/181 |
| 8,979,416 B2 * | 3/2015 | Itoh | ......................... | B32B 37/18 228/173.6 |
| 9,382,933 B2 * | 7/2016 | Sottiaux | ................. | B64D 27/26 |
| 2011/0094656 A1 * | 4/2011 | Ferrari | ...................... | C09J 5/10 156/158 |
| 2013/0114945 A1 * | 5/2013 | Pionetti | .................... | F16L 1/15 392/472 |
| 2013/0294824 A1 * | 11/2013 | Pisinger | ................. | F16D 3/387 403/359.1 |
| 2016/0017909 A1 * | 1/2016 | Erlacher | .................... | C09J 5/08 403/265 |
| 2017/0227059 A1 * | 8/2017 | Kamikawa | ................ | F16C 3/02 |

* cited by examiner

LEFT ←——→ RIGHT

CONNECTING SHAFT AND MANUFACTURING METHOD OF CONNECTING SHAFT

CROSS-REFERENCE TO RELATED APPLICATION

This application is based upon and claims the benefit of priority from Japanese Patent Application No. 2016-023599 filed on Feb. 10, 2016, the content of which is incorporated herein by reference.

BACKGROUND OF THE INVENTION

Field of the Invention

This invention relates to a connecting shaft including interconnected multiple shafts and a manufacturing method of the connecting shaft.

Description of the Related Art

Conventionally, as a shaft of this type is known one comprising an end joint, an FRP cylinder whose inner peripheral surface fits over part of a serrated portion formed on an outer peripheral surface of the end joint, and an outer collar connecting the end joint and the FRP cylinder. In the shaft described in Japanese Unexamined Patent Publication (JP2014-222069A), for example, the outer collar has a small-diameter portion whose inner peripheral surface fits over a remaining part of the serrated portion and a large-diameter portion whose inner peripheral surface fits over an outer peripheral surface of the FRP cylinder, and the inner peripheral surface of the large-diameter portion is adhered to the outer peripheral surface of the FRP cylinder by adhesive.

However, in the shaft described in JP2014-222069A, the axial direction end face of the large-diameter portion of the outer collar in the adhered state is exposed, so that adhesive strength is degraded by rust invading at the interface between the inner peripheral surface of the large-diameter portion and the adhesive.

SUMMARY OF THE INVENTION

According to an aspect of the present invention, a connecting shaft includes: a first shaft made of metal, the first shaft including a serration formed on an outer peripheral surface at an end part thereof, the serration including a first region and a second region; a second shaft made of resin, the second shaft including an inner peripheral surface fitting on the first region of the serration at an end part thereof; and a collar made of metal, the collar including a first fitting portion fitting on the second region of the serration and a second fitting portion fitting on an outer peripheral surface of the second shaft, wherein a gap between the outer peripheral surface of the second shaft and an inner peripheral surface of the second fitting portion is filled with an adhesive agent, and wherein the adhesive agent is applied from the gap up to an outer peripheral surface of the collar to cover an end face of the second fitting portion in an axial direction.

According to another aspect of the present invention, a manufacturing method of a connecting shaft including a first shaft made of metal, a second shaft made of resin, and a collar made of metal, the collar including a first fitting portion and a second fitting portion with an inner diameter larger than an inner diameter of the first fitting portion, the manufacturing method includes: forming a serration including a first region and second region, on an outer peripheral surface at an end part of the first shaft; fitting an inner peripheral surface of the first fitting portion of the collar on the second region of the serration; filling a gap between the first region of the serration and an inner peripheral surface of the second fitting portion with an adhesive agent; fitting an inner peripheral surface of the second shaft on the first region of the serration so as to force out the adhesive agent into a gap between an outer peripheral surface of the second shaft and the inner peripheral surface of the second fitting portion; and applying the adhesive agent forced out beyond an end face of the second fitting portion in an axial direction up to an outer peripheral surface of the collar to cover the end face.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
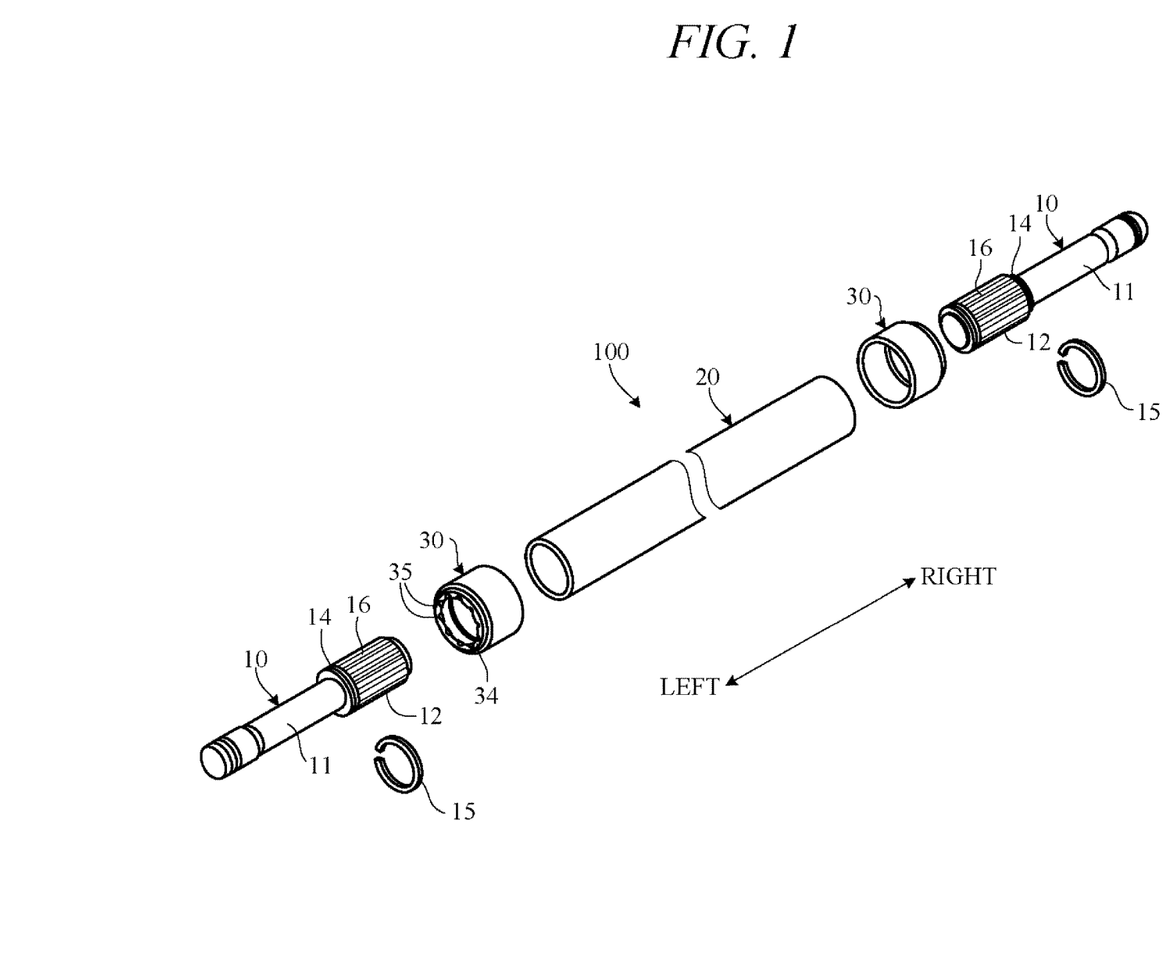
FIG. 1 is a perspective view of a connecting shaft according to an embodiment of the present invention in a disassembled state.
Figure 2:
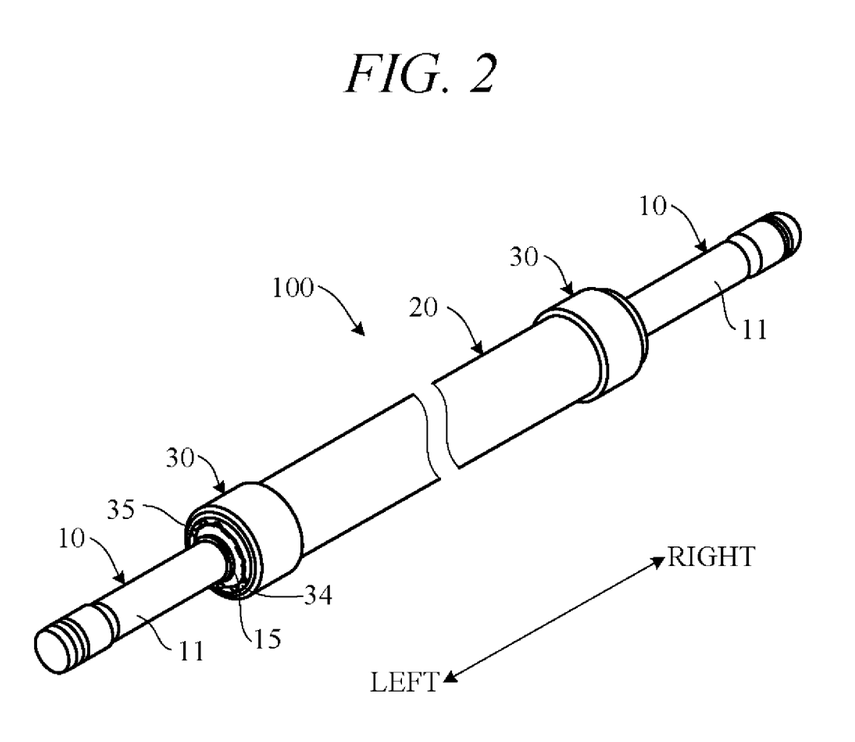
FIG. 2 is a perspective view of the connecting shaft according to the embodiment of the present invention in an assembled state.

Below, referring to FIGS. 1 to 8B, an embodiment of the present invention will be explained. FIG. 1 is a perspective view showing a connecting shaft 100 according to an embodiment of the present invention in a disassembled state, and FIG. 2 is a perspective view thereof in an assembled state. The connecting shaft 100 is adapted to function as a torque transmitting element for transmitting torque from an engine or other power source to wheels or other torque receiving element, and is utilized, for example, as a vehicle driveshaft. For convenience in the following, and as seen in the drawings, axial direction of the connecting shaft 100 is defined as lateral (left-right) direction and its components are explained in accordance with this definition.

As shown in FIGS. 1 and 2, the connecting shaft 100 has paired left and right first shafts 10, a second shaft 20 disposed between the first shafts 10, and paired left and right collars 30 that integrally join the first shafts 10 and the second shaft 20. The connecting shaft 100 exhibits lateral symmetry as whole. When the connecting shaft 100 is used as a driveshaft, driving power (torque) from an engine is input to the end of one of the first shafts 10 (e.g., right end of the first shaft 10 on the right side). This torque is transmitted through the second shaft 20 to wheels from one end of the other first shaft 10 (e.g., left end of the first shaft 10 on the left side).

Figure 3:
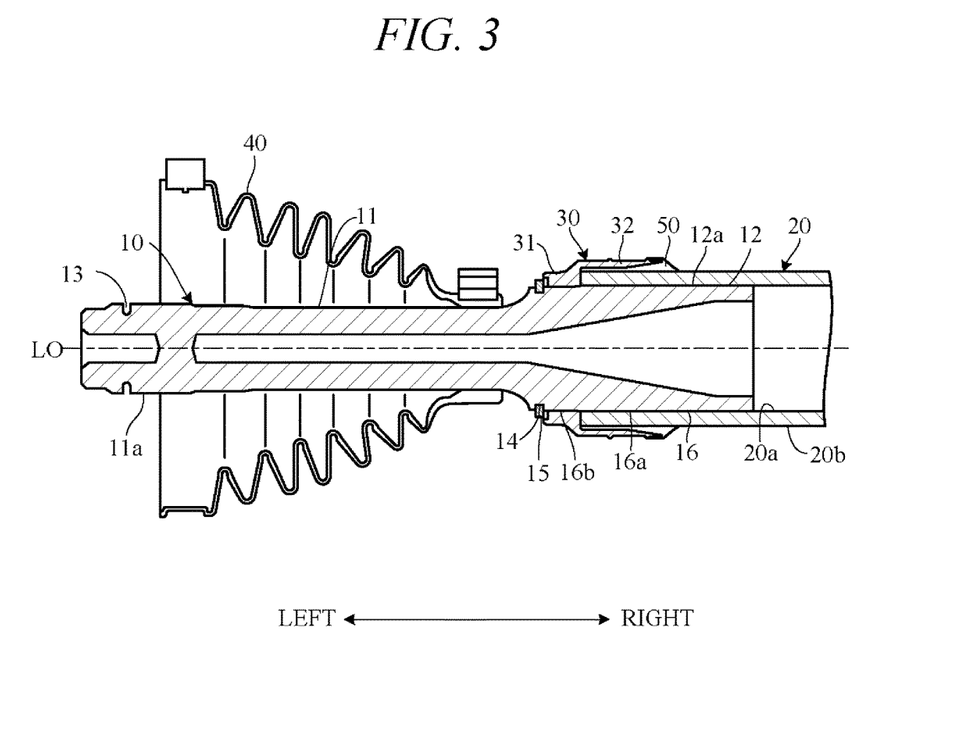
FIG. 3 is a cross-sectional view showing main configurations of the connecting shaft according to the embodiment of the present invention.

FIG. 3 is a cross-sectional view showing a connection structure of the left-side first shaft 10 and the second shaft 20. Although omitted in the drawing, the connection structure of the right-side first shaft 10 and the second shaft 20 is the same as that shown in FIG. 3. In the following, therefore, explanation of the component structures is focused mainly on the connection structure of the left-side first shaft 10 and the second shaft 20.

The first shaft 10 is made of iron or other metal. As shown in FIG. 3, the first shaft 10 has a small diameter section 11 on the left and a large diameter section 12 on the right respectively having outer peripheral surfaces 11a and 12a of cylindrical shape centered on an axis L0. The outer peripheral surface 12a is of greater diameter than the outer peripheral surface 11a, and the outer peripheral surface 11a and outer peripheral surface 12a are connected by a smooth curved surface. A joint 13 for connecting the first shaft 10 to wheels for example, is provided at the left end of the small diameter section 11. A bellows-like boot 40 is fitted around the first shaft 10, and a right end of the boot 40 is attached to the outer peripheral surface 11a of the right end of the small diameter section 11.

An annular groove 14 is provided on the left end of the large diameter section 12. A right face of the groove 14 is made flush or substantially flush with an end face 34 of the collar 30 (see FIG. 4), and a metal circlip 15 is fitted in the groove 14. As shown in FIG. 1, the circlip 15 is formed as a partially cut-away ring of C-like shape that can be opened by elastic deformation and fitted in the groove 14.

As shown in FIG. 3, the outer peripheral surface of the large diameter section 12 rightward of the groove 14 is formed with serrations 16, such as triangular serrations, involute serrations or the like. Although the serrations 16 are shown to be integrally formed in the axial direction of the large diameter section 12 in FIG. 1, this is not a limitation and it is alternatively possible for them to be formed in a number of ring-like divisions along the axial direction of the large diameter section 12. Hardness of the serrations 16 is higher than hardness of the second shaft 20 and the collar 30. As shown in FIG. 3, the serrations 16 include axially adjacent first and second regions 16a and 16b.

The second shaft 20 is made of fiber reinforced plastic (FRP) or other resin to exhibit an overall cylindrical shape centered on the axis L0, as shown in FIGS. 1 and 3. More specifically, it can be configured of, for example, multiple carbon fiber reinforced plastic (CFRP) layers by cylindrically wrapping and thermosetting multiple prepregs formed by impregnating carbon fiber into thermosetting resin sheets. Alternatively, the second shaft 20 can be formed by injection molding a resin dispersed with short carbon fibers. An inner peripheral surface 20a of the second shaft 20 fits axially over a distal end part of the serrations 16 (the first region 16a in FIG. 3).

The collar 30 is made of iron or other metal. The collar 30, which is formed in a substantially cylindrical shape centered on the axis L0, has a first fitting portion 31 that fits over an axial direction remaining part on the small diameter section 11 side of the serrations 16 (second region 16b in FIG. 3) and a second fitting portion 32 that fits over an outer peripheral surface 20b of the second shaft 20.

Figure 4:
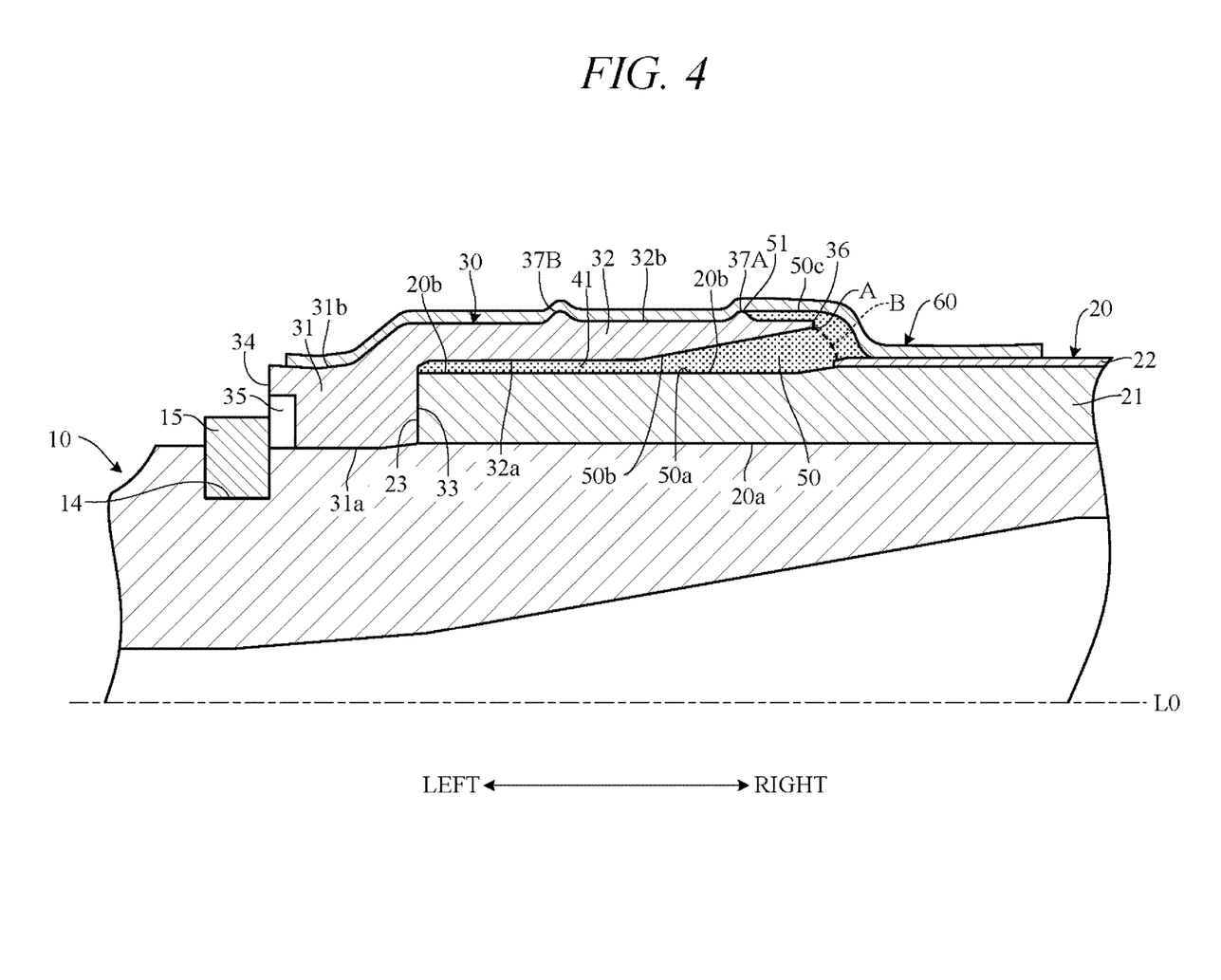
FIG. 4 is an enlarged view showing main configurations in FIG. 3.

FIG. 4 is an enlarged view of main components in FIG. 3. As shown in FIG. 4, an inner peripheral surface 32a of the second fitting portion 32 is of greater diameter than an inner peripheral surface 31a of the first fitting portion 31, and the inner peripheral surfaces 31a and 32a are interconnected by an end face 33 perpendicular to the axis L0. An axial direction end face 23 of the second shaft 20 abuts the end face 33. The collar 30 has a cylindrical first outer peripheral surface 31b on its first fitting portion 31 side and a cylindrical second outer peripheral surface 32b on its second fitting portion 32 side, both of which outer peripheral surfaces are centered on the axis L0. The second outer peripheral surface 32b is of greater diameter than the first outer peripheral surface 31b.

The left end face 34 of the collar 30 abuts on a right end face of the circlip 15. As seen in FIG. 1, multiple circumferentially spaced recesses 35 are formed in the left end face 34 of the collar 30. The recesses 35 are formed as concavities cut in approximately semicircular shape radially outward from the inner peripheral surface 31a of the first fitting portion 31 at a predetermined depth in the axial direction. The outermost diameter of the recesses 35 is greater than the outer diameter of the circlip 15. Since the recesses 35 are therefore partially exposed outward of the circlip 15, the recesses 35 communicate with space outside the connecting shaft 100.

Diameter of the inner peripheral surface 32a of the second fitting portion 32 of the collar 30 is greater by a predetermined length than diameter of the outer peripheral surface 20b of the second shaft 20, so that a gap 41 of predetermined radial direction length is formed between and completely around the outer peripheral surface 20b and the inner peripheral surface 32a. The inner peripheral surface 32a of the second fitting portion 32 is tapered radially inward from a right end face 36 of the collar 30 and the gap 41 expands along the tapered portion up to the right end face 36. In the gap 41, adhesive agent 50 is interposed between the outer peripheral surface 20b of the second shaft 20 and the inner peripheral surface 32a of the second fitting portion 32, and these surfaces serve as bonding surfaces 50a and 50b.

When the connecting shaft 100 is used as a drive shaft, its circumference is apt to rise to a high temperature owing to the effect of, for example, exhaust gas. Therefore, the adhesive agent 50 should preferably have heat resistance. A two-part liquid epoxy adhesive agent having a certain degree of viscosity, for example, is suitable for use. Since the second shaft 20 and the collar 30 are integrally joined via the adhesive agent 50, it is possible during transmission of torque between the first shaft 10 and the second shaft 20 to minimize rotational torque difference between rotational torque of the inner peripheral surface side of the second shaft 20 and rotational torque of the outer peripheral surface side of the second shaft 20. Although adhesive agent having heat resistance like the adhesive agent 50 is generally hard, adhesive agent deformability increases with decreasing hardness. In the light of this point, a low-hardness adhesive agent is preferably used insofar as heat resistance is ensured.

Although omitted in FIGS. 1 and 2, as shown in FIG. 4, the second outer peripheral surface 32b of the collar 30 is provided with a pair of laterally spaced projections 37A and 37B extending completely therearound. The projections 37A and 37B project radially by the same length. A line connecting the tops of the projections 37A and 37B (not shown) therefore lies parallel to the axis L0.

The gap 41 between the outer peripheral surface 20b of the second shaft 20 and the inner peripheral surface 32a of the second fitting portion 32 is filled with the adhesive agent 50, and is further applied to completely cover the right end face 36 of the second fitting portion 32 and extend onto the projection 37A on the right side of the second outer peripheral surface 32b. Diameter of an outer peripheral surface 50c of the adhesive agent 50 extending to the projection 37A is the same as that of the projection 37A. Therefore, a bonding surface 50b of the collar 30 and the adhesive agent 50 is not exposed at the right end face 36 of the collar 30, and an interface edge of the adhesive agent 50 (interfacing edge 51) is situated next to the projection 37A of the second outer peripheral surface 32b. More specifically, the interfacing edge 51 is located at the top of the projection 37A.

An anticorrosion coating 60 is applied to entirely cover the adhesive agent 50. The anticorrosion coating 60 is applied from an outer peripheral surface (e.g., the first outer peripheral surface 31b) of the collar 30 as far as onto the outer peripheral surface 20b of the second shaft 20. As a specific example, the outer peripheral surface 20b of the second shaft 20 is formed on its carbon fiber layer (CF layer 21) exterior with a glass fiber layer (GF layer 22). In this case, the adhesive agent 50 is applied as far as onto the GF layer 22 and the anticorrosion coating 60 is also applied as far as onto the GF layer 22.

Thus, in the present embodiment, the adhesive agent 50 is applied to cover the axial direction end face 36 of the collar 30 and extend onto the outer peripheral surface 32b of the collar 30. As a result, the interface of the adhesive agent 50 is not exposed, because the interfacing edge 51 is not present at a bonding region between the second shaft 20 and the collar 30. Intrusion of rust into the interface of the adhesive agent 50 as a result of moisture adhering to the interfacing edge of the adhesive agent 50 can therefore be prevented.

To explain in further detail, in a case where the second shaft 20 and the collar 30 are made of resin and metal, respectively, electrolytic corrosion readily occurs owing to electric potential difference between the two. In addition, the two differ greatly in coefficient of linear thermal expansion, so that temperature changes are accompanied by occurrence of thermal stress at interfaces with the adhesive agent 50 (bonding surfaces 50a and 50b). Moreover, when rotational torque is input to the connecting shaft 100, torsional stress is produced between the second shaft 20 and the collar 30. Therefore, if, as indicated by dotted line B in FIG. 4, the adhesive agent 50 should be applied only in the bonding region between the second shaft 20 and the collar 30, so that the interfacing edge (position A) of the adhesive agent 50 would be present adjacent to the right end face 36 of the collar 30, interface peeling of the adhesive agent 50 would easily occur to pose a risk of rust invading from the interfacing edge into the interface (bonding surface 50b).

When rust enters the bonding surface 50b, interface peeling of the adhesive agent 50 progresses and degrades adhesion strength. An attempt to prevent rust intrusion by covering the outer surface of the adhesive agent 50 with a coating fails because a coating of adequate thickness cannot be ensured at the edge (position A) of the collar 30. Therefore, in a case where the interfacing edge of the adhesive agent 50 is present adjacent to the collar end face 36, intrusion of rust from the interfacing edge occurs readily regardless of whether a coating is applied.

To deal with this point, in the present embodiment the interfacing edge 51 of the adhesive agent 50 is positioned at the second outer peripheral surface 32b of the collar 30, so that no torque due to torsion of the connecting shaft 100 acts on the interfacing edge 51. Further, the interfacing edge 51 is not inside but outside the bonding region of the second shaft 20 and collar 30 and does not constitute the bonding surface 50a or 50b. As a result, the effect on the interfacing edge 51 of thermal stress owing to difference in coefficient of linear thermal expansion between resin and iron and the effect thereon of electrolytic corrosion owing to difference of electric potential difference between resin and iron can both be inhibited. In addition, the anticorrosion coating 60 can be applied to cover the interfacing edge 51 to an adequate thickness. Intrusion of rust into the interface of the adhesive agent 50 is therefore prevented and stable adhesive strength maintained.

Another matter of concern is that a great difference in Young's modulus between the resin constituting the structural material of the second shaft 20 and the iron constituting the collar 30 promotes occurrence of stress concentration in the end region of the collar 30. With consideration to this point, the end region of the collar 30 is configured in a tapered shape in the present embodiment. Namely, the diameter of the inner peripheral surface 32a of the collar is expanded up to the end face 36 of the second fitting portion 32. As a result, thickness of the collar 30 grows thinner, thereby enabling easier deformation of the collar 30 and a proportional increase in thickness of the adhesive agent 50. This mitigates stress concentration in the end region of the collar 30. However, tapering of the end portion of the collar 30 may not be required, and, for example, the inner peripheral surface 32a may be extended up to the end face 36 in parallel to the axis L0.

Figure 5A:
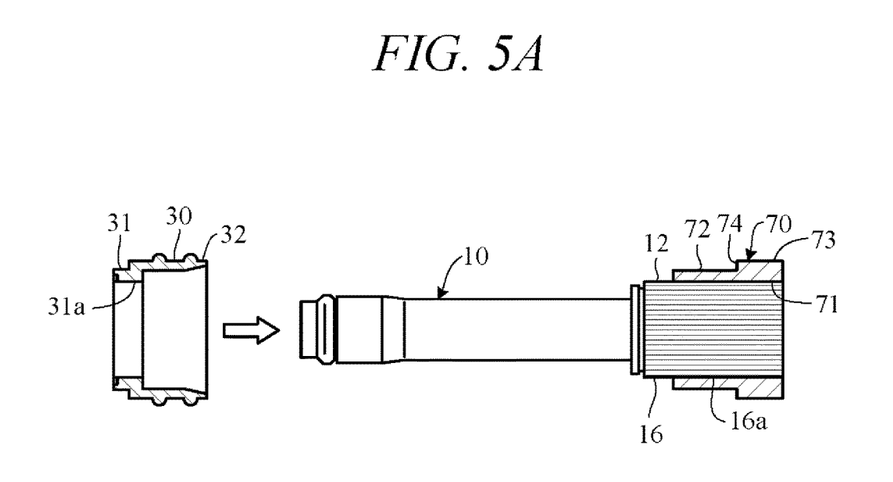
FIG. 5A is a first view for explaining a manufacturing method of the connecting shaft according to an embodiment of the present invention.

A manufacturing method of the connecting shaft 100 according an embodiment of the present invention is explained with reference to FIGS. 5A to 5G in the following. At the start of manufacture of the connecting shaft 100, the first fitting portion 31 of the collar 30 is press-fitted onto the first shaft 10 (collar press-fit process). This process is preferably performed using a roughly cylindrical jig 70, as shown in FIG. 5A.

The jig 70 includes an inner peripheral surface 71 which fits onto the large diameter section 12 of the first shaft 10, a first outer peripheral surface 72 over which the second fitting portion 32 of the collar 30 fits, a second outer peripheral surface 73 of greater diameter than the first outer peripheral surface 72, and an end face 74 which extends radially to connect the first outer peripheral surface 72 and second outer peripheral surface 73. The jig 70 is fitted onto the large diameter section 12 of the first shaft 10 in advance and retained in a state with its axial direction end face on the second outer peripheral surface 73 side aligned with the axial direction end face of the large diameter section 12. In other words, the jig 70 is retained on the first region 16a of the serrations 16.

Figure 5B:
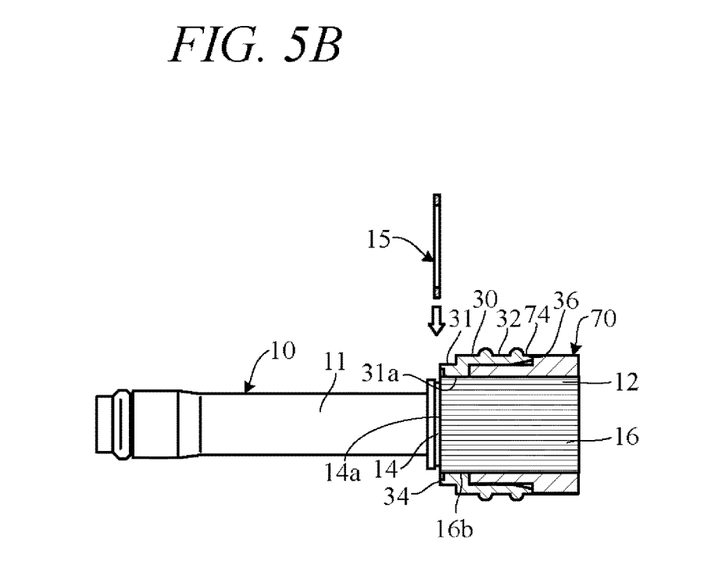
FIG. 5B is a second view for explaining the manufacturing method of the connecting shaft according to the embodiment of the present invention.

In the collar press-fit process, as shown in FIG. 5B, the collar 30 is press-fitted by a predetermined amount from the small diameter section 11 side of the first shaft 10 until the end face 36 on the second fitting portion 32 side abuts the end face 74 of the jig 70. This establishes the axial direction position of the collar 30 relative to the first shaft 10 and deploys the collar 30 on the second region 16b of the serrations 16. The press-fitting of the collar 30 transfers the serrated shape of the large diameter section 12 of the first shaft 10 to the inner peripheral surface 31a of the first fitting portion 31 of the collar 30. This press-fit process fixes the collar 30 on the second region 16b of the first shaft 10.

Figure 5C:
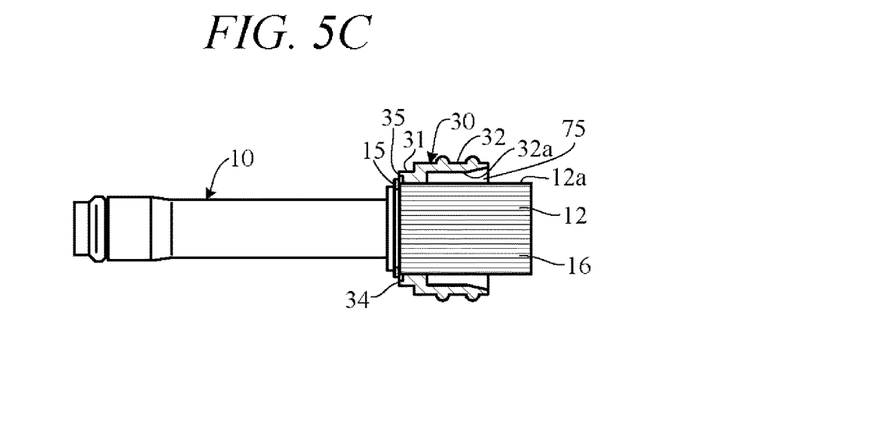
FIG. 5C is a third view for explaining the manufacturing method of the connecting shaft according to the embodiment of the present invention.

In the state of the collar 30 press-fitted by the predetermined amount, the inner peripheral surface 31a of the first fitting portion 31 is beyond the groove 14 of the first shaft 10 and the positions of the axial direction end face 34 of the first fitting portion 31 and the axial direction end face of the groove 14 are substantially aligned. Next, as shown in FIG. 5C, the circlip 15 is fitted in the groove 14, and the jig 70 is removed from the first shaft 10 (circlip attachment process). The attached circlip 15 restricts axial direction movement of the collar 30 relative to the first shaft 10. In this state, the recesses 35 formed in the end face 34 of the collar 30 are partially covered by the circlip 15 and the remainders thereof outward of the circlip 15 are exposed.

Figure 5D:
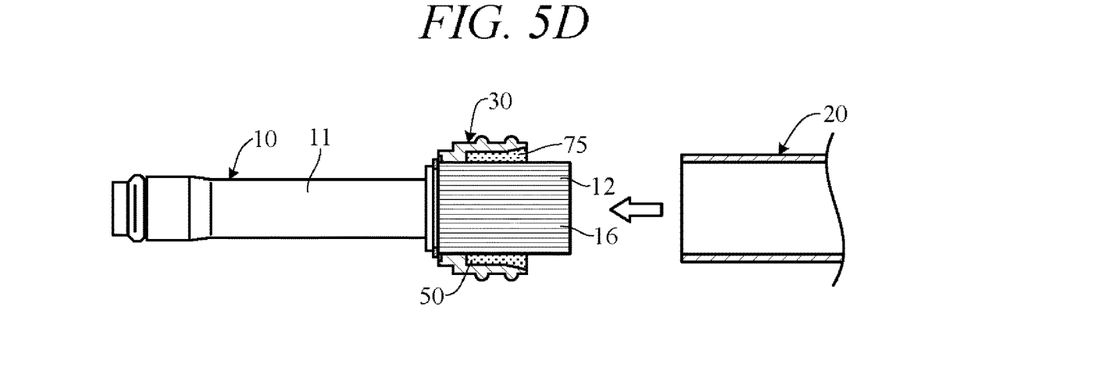
FIG. 5D is a fourth view for explaining the manufacturing method of the connecting shaft according to the embodiment of the present invention.

When the jig 70 is removed from the first shaft 10, a gap 75 is appears throughout between the outer peripheral surface 12a of the large diameter section 12 of the first shaft 10 and the inner peripheral surface 32a of the second fitting portion 32 of the collar 30. As shown in FIG. 5D, the gap 75 is filled with the adhesive agent 50 (adhesive agent filling process). The adhesive agent 50 is preferably charged from above with the first shaft 10 erected to a vertical orientation with its small diameter section 11 underneath. This enables uniform charging of the adhesive agent 50 into the gap 75 in the circumferential direction.

Figure 5E:
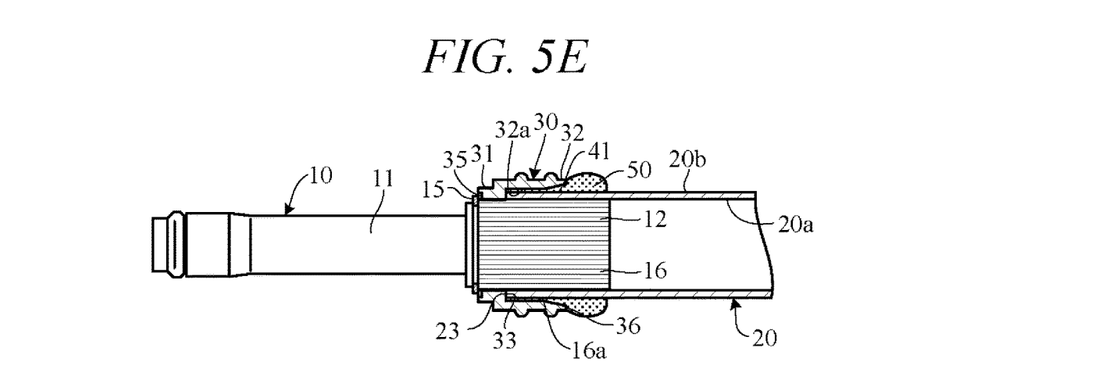
FIG. 5E is a fifth view for explaining the manufacturing method of the connecting shaft according to the embodiment of the present invention.

Next, the second shaft 20 is press-fitted onto the large diameter section 12 of the first shaft 10 (shaft press-fit process). Namely, as shown in FIG. 5E, the second shaft 20 is press-fitted until the end face 23 of the second shaft 20 abuts the end face 33 inside the collar 30. This establishes the axial direction position of the second shaft 20 relative to the first shaft 10 and deploys the end portion of the second shaft 20 on the first region 16a of the serrations 16. The press-fitting of the second shaft 20 transfers the serrated shape of the large diameter section 12 of the first shaft 10 to the inner peripheral surface 20a of the second shaft 20. This press-fit process fixes the second shaft 20 on the first region 16a of the first shaft 10.

The press-fitting of the second shaft 20 reduces the volume of the gap 75. Therefore, the adhesive agent 50 present in the gap 75 is forced into the gap 41 between the outer peripheral surface 20b of the second shaft 20 and the inner peripheral surface 32a of the second fitting portion 32 of the collar 30. Excess adhesive agent 50 passes through the gap 41 and flows beyond the right end face 36 of the second fitting portion 32 to be forced outside the gap 41. The forced out adhesive agent 50 accumulates in the vicinity of the right end face 36 of the collar 30.

Some of the adhesive agent 50 inside the gap 75 is forced into a gap between the first fitting portion 31 of the collar 30 and the large diameter section 12 of the first shaft 10 (second region 16b of the serrations 16). As a result, a layer of the adhesive agent 50 is formed between the first fitting portion 31 of the collar 30 and the first shaft 10, whereby the first fitting portion 31 and first shaft 10 are put in a non-contact condition. In a case where bubbles are present in the adhesive agent 50 between the collar 30 and first shaft 10, the bubbles are discharged through the recesses 35 into the atmosphere around the connecting shaft 100. Therefore, it is possible to fill the adhesive agent 50 between the collar 30 and first shaft 10 free of voids.

Next, the adhesive agent 50 accumulated near the right end face 36 of the collar 30 is applied to cover the end face 36 and extend as far as onto the second outer peripheral surface 32b of the collar 30 (adhesive agent application process). This process is performed, for example, with a plate-like spatula 80 having a roughly rectangular cutout 81, as shown in FIG. 5F.

Figure 5F:
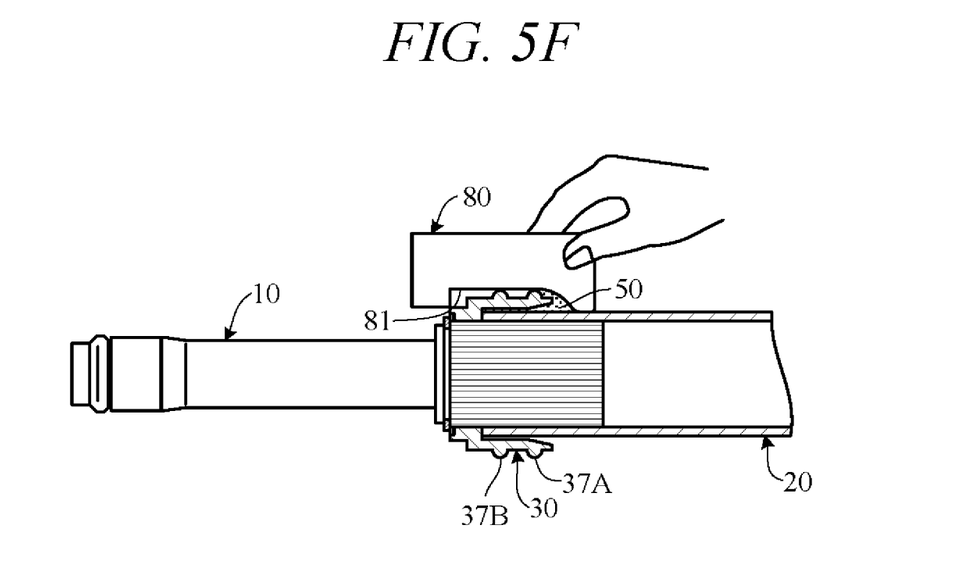
FIG. 5F is a sixth view for explaining the manufacturing method of the connecting shaft according to the embodiment of the present invention.
Figure 6:
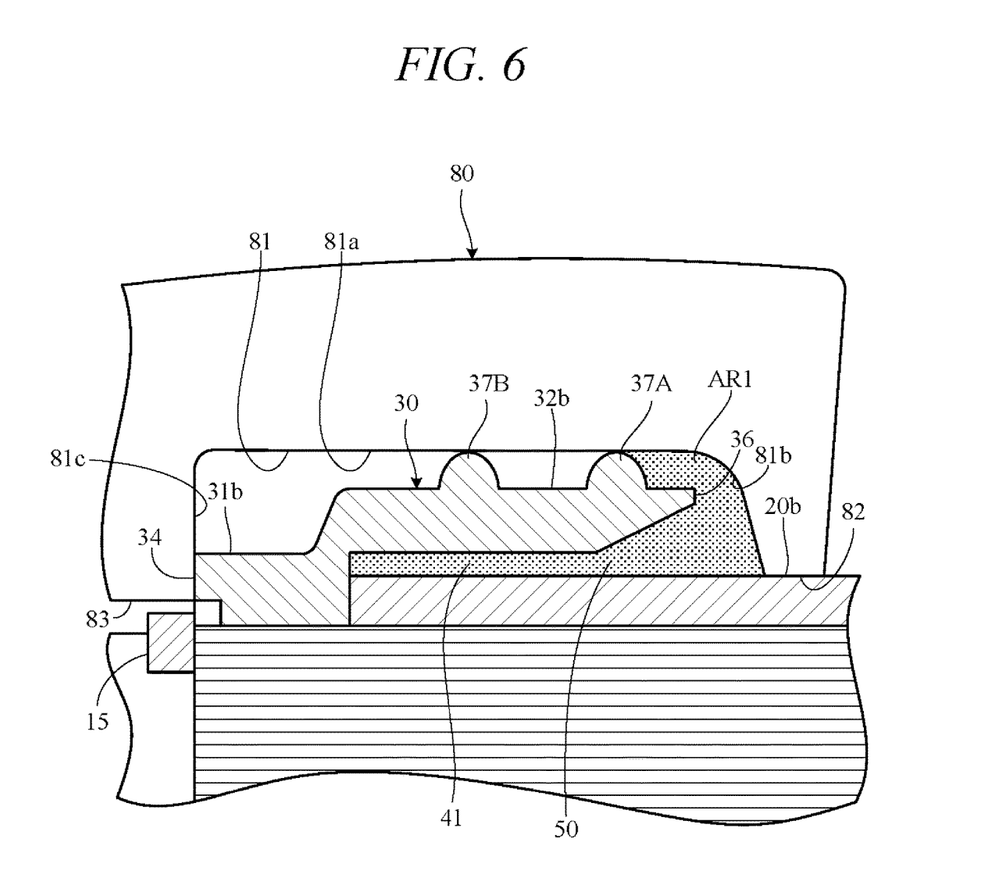
FIG. 6 is an enlarged view showing main configurations in FIG. 5F.

FIG. 6 is an enlarged view of a main part of FIG. 5F. As shown in FIG. 6, the spatula 80 has a first edge 82 and a second edge 83 on opposite sides of the cutout 81. Vertical distance between a bottom surface 81a of the cutout 81 and the first edge 82 is equal to vertical distance between the tops of the projections 37A and 37B of the second outer peripheral surface 32b of the collar 30 and the outer peripheral surface 20b of the second shaft 20, and vertical distance between the bottom surface 81a of the cutout 81 and the second edge 83 is greater than vertical distance between the tops of the projections 37A and 37B and the first outer peripheral surface 31b of the collar 30 and less than vertical distance to the outer peripheral surface of the circlip 15. A bottom surface corner 81b on the side of the first edge 82 of the cutout 81 is formed to have an arcuate or smoothly curved shape. Axial direction length of the cutout 81 is longer by a predetermined length than the length from the one end face 34 to the other right end face 36 of the collar 30.

In the adhesive agent application process, a worker first brings an end face 81c of the cutout 81 on the side of the second edge 83 into contact with the end face 34 of the collar 30, and brings the bottom surface 81a of the cutout 81 into contact with the tops of the pair of projections 37A and 37B of the collar 30. While maintaining this state, the worker then circles the spatula 80 around the peripheral surface of the collar 30 at least one rotation. According to this, a region AR1 enclosed by the cutout 81 of the spatula 80, a section extending from the end face 36 of the collar 30 across the second outer peripheral surface 32b to the projection 37A, and the outer peripheral surface 20b of the second shaft 20 is filled with the adhesive agent 50, and excess adhesive agent 50 outside the region AR1 is scraped away by the spatula 80. As a result, the adhesive agent 50 is applied so as to wholly cover the right end face 36 of the collar 30 and extend as far as onto the projection 37A of the second outer peripheral surface 32b. At this time, the adhesive agent 50 assumes a surface profile corresponding to the shape of the cutout 81.

Figure 5G:
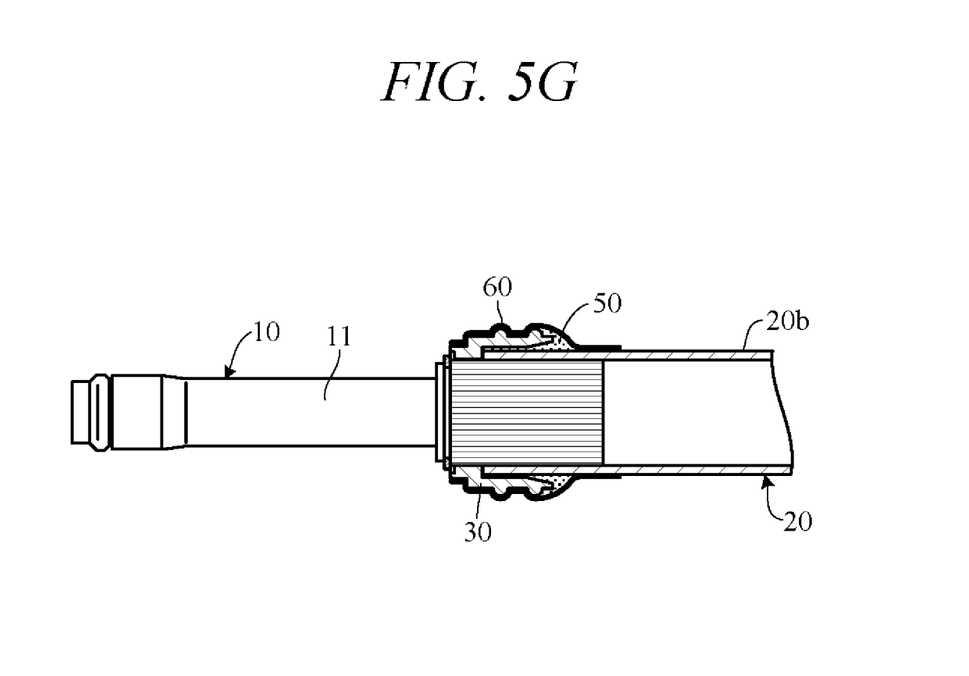
FIG. 5G is a seventh view for explaining the manufacturing method of the connecting shaft according to the embodiment of the present invention.

Finally, an anticorrosion coating 60 is applied to cover the entire surface of the adhesive agent 50 and extend across the second outer peripheral surface 32b of the collar 30 as far as onto the outer peripheral surface 20b (coating process). In this case, the anticorrosion coating 60 can be applied to cover all of the outer peripheral surface of the collar 30 (first outer peripheral surface 31b and second outer peripheral surface 32b), as shown in FIG. 5G, or so as to cover not only the whole outer peripheral surface of the collar 30 but also part of the outer peripheral surface 11a of the small diameter section 11 of the first shaft 10. Since the bottom surface corner 81b of the cutout 81 of the spatula 80 is formed to have an arcuate or smoothly curved shape, the surface of the adhesive agent 50 is correspondingly formed to have an arcuate or smoothly curved shape. The anticorrosion coating 60 can therefore be easily applied on the surface of the adhesive agent 50 to adequate thickness in the coating process.

The present embodiment can achieve advantages and effects such as the following:

(1) The connecting shaft 100 includes the metal first shaft 10 whose outer peripheral surface 12a at one end (large diameter section 12) is formed with the serrations 16, the resin second shaft 20 whose inner peripheral surface 20a at one end fits onto the first region 16a of the serrations 16, the first fitting portion 31 that fits on the second region 16b of the serrations 16, and the metal collar 30 having the second fitting portion 32 which fits on the outer peripheral surface 20b of the second shaft 20 with the adhesive agent 50 sandwiched therebetween (FIG. 3). A gap 41 between the outer peripheral surface 20b of the second shaft 20 and the inner peripheral surface 32a of the second fitting portion 32 is filled with the adhesive agent 50, and applied from the gap 41 up to the outer peripheral surface 32b of the collar 30 to cover the axial direction end face 36 of the second fitting portion 32 (FIG. 4).

As a result, no interfacing edge of the adhesive agent 50 is exposed at the bonding region between the second shaft 20 and collar 30, and the interfacing edge 51 is located on the outer peripheral surface 32b of the collar 30. Therefore, in the connecting shaft 100 constituted by joining the resin second shaft 20 and the metal collar 30 through the adhesive agent 50, intrusion of rust into the interface (bonding surface 50b) of the adhesive agent 50 owing to moisture adhering to the interfacing edge 51 of the adhesive agent 50 can be prevented and sufficient adhesive strength can be maintained.

(2) The collar 30 has the projection 37A projected radially outward from its outer peripheral surface 32b over a whole circumference, and the adhesive agent 50 is applied up to the projection 37A (FIG. 4). Since this enables the adhesive agent 50 to be applied to the same height as the projection 37A, smooth application of the adhesive agent 50 with no level difference at the outer peripheral surface 32b of the collar 30 can be achieved.

(3) The anticorrosion coating 60 is applied from the outer peripheral surface 32b of the collar 30 to the outer peripheral surface 20b of the second shaft 20 and thereby cover the adhesive agent 50 applied up to the outer peripheral surface 32b of the collar 30 (FIG. 4). Since this prevents adhesion of moisture to the interfacing edge 51 of the adhesive agent 50, it reliably prevents intrusion of rust at the interface of the adhesive agent 50. Moreover, in the present embodiment, since the adhesive agent 50 is applied up to the outer peripheral surface 32b of the collar 30, the anticorrosion coating 60 can be easily applied to cover the whole surface of the adhesive agent 50 to adequate thickness with no coating interstices.

(4) The manufacturing method of the connecting shaft 100 includes the process of fitting the inner peripheral surface 31a of the first fitting portion 31 of the metal collar 30 having the first fitting portion 31 and the second fitting portion 32 of larger inner diameter than the first fitting portion 31 on the second region 16b of the serrations 16 formed of the first and second regions 16a and 16b on the outer peripheral surface 12a of one end portion (large diameter section 12) of the metal first shaft 10 (collar press-fit process), the process of filling the gap 75 between the first region 16a of the serrations 16 and the inner peripheral surface 32a of the second fitting portion 32 with the adhesive agent 50 (adhesive agent filling process), the process of fitting the inner peripheral surface 20a of the resin second shaft 20 onto the first region 16a of the serrations 16 (shaft press-fit process), and the process of, by the fitting of the second shaft 20, forcing out the adhesive agent 50 into the gap 41 between the outer peripheral surface 20b of the second shaft 20 and the inner peripheral surface 32a of the second fitting portion 32 and of applying the adhesive agent 50 passing through the gap 41 and forced out beyond the axial direction end face 36 of the second fitting portion 32 to cover the end face 36 up to the outer peripheral surface 32b of the collar 30 (adhesive agent application process) (FIGS. 5A to 5F).

As a result, it is possible to easily fill the gap 41 between the outer peripheral surface 20b of the second shaft 20 and the inner peripheral surface 32a of the second fitting portion 32 of the collar 30 with the adhesive agent 50 free of voids into, and easily apply the adhesive agent 50 up to the peripheral surface 32b of the collar 30 to cover the axial direction end face 36 of the second fitting portion 32.

(5) The outer peripheral surface 32b of the collar 30 is provided completely therearound with the pair of axially spaced, radially projecting projections 37A and 37B. In the adhesive agent application process, after fitting the inner peripheral surface 20a of the second shaft 20 on the first region 16a of the serrations 16, an edge of the plate-like spatula 80 (bottom surface 81a of the cutout 81) is brought into contact with the pair of projections 37A, 37B and the spatula 80 is circled around the collar 30 one rotation while keeping the bottom surface 81a in contact with the projections 37A, 37B, whereby the region AR1 between the cutout 81 of the spatula 80 and the outer peripheral surface 32b of the collar 30 is filled with the adhesive agent 50 forced out beyond the axial direction end face 36 (FIG. 6). This makes it possible to apply the adhesive agent 50 to uniform height throughout the axial length of the outer peripheral surface 32b of the collar 30. Moreover, the collar 30 not only has the projection 37A constituting the terminal point of the adhesive agent 50 but also has the projection 37B provided on the outer peripheral surface 32b of the collar 30 farther toward the side of the first fitting portion 31 than the projection 37A to project radially completely therearound. This makes it possible to rotate the bottom surface 81a of the cutout 81 of the spatula 80 centered on and maintained parallel to the axis L0, and thus form the outer peripheral surface 50c of the adhesive agent 50 covering the outer peripheral surface 32b of the collar 30 into cylindrical shape.

Figure 7:
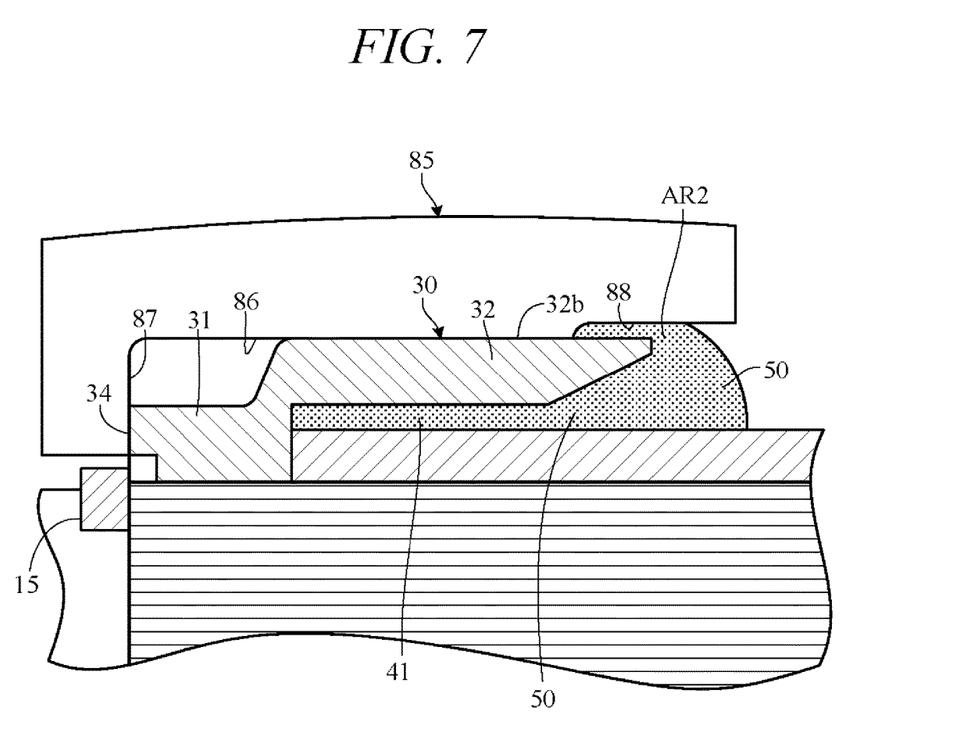
FIG. 7 is a view showing a first modification of the manufacturing method of the connecting shaft according to the embodiment of the present invention.

In the method according to the embodiment described in the foregoing, the pair of projections 37A and 37B is provided on the outer peripheral surface 32b of the collar 30, and the adhesive agent application process is performed by moving the spatula 80 to make one rotation around the collar 30 while keeping the bottom surface 81a of the cutout 81 of the spatula 80 in contact with both of the projections 37A and 37B, thereby applying the adhesive agent 50 in a predetermined shape as far as onto the outer peripheral surface 32b of the collar 30. However, a jig for applying the adhesive agent 50 during the adhesive agent application process is not limited to the aforesaid structure. FIG. 7 is a view showing a jig according to a first modification.

A plate-like spatula 85 shown in FIG. 7 is formed roughly L-shaped. The spatula 85 therefore has a first edge 86 and a second edge 87 which meet at a right angle on the inside of the L. In addition, the spatula 85 has a cutout 88 cut to a predetermined depth at the distal end portion of the first edge 86. The cutout 88 is formed from a point on the first edge 86 to begin with an arcuate or smoothly curved shape and then extend parallel to the first edge 86 up to the distal end of the spatula 85. In this case, no projections are formed on the outer peripheral surface 32b of the collar 30, and the adhesive agent application process is begun by first bringing the second edge 87 of the spatula 85 into contact with the end face 34 on the first fitting portion 31 side of the collar 30 and bringing the first edge 86 of the spatula 85 into contact with the second outer peripheral surface 32b of the collar 30.

Next, while maintaining this state, the spatula 85 is moved to circle around the outer peripheral surface of the collar 30 at least once. Therefore, a region AR2 between the cutout 88 of the spatula 85 and the outer peripheral surface 32b of the collar 30 is filled with the adhesive agent 50 and thus it is possible to apply the adhesive agent 50 from the outer peripheral surface 32b of the collar 30 up to the outer peripheral surface 20b of the second shaft 20. In this case, the adhesive agent 50 assumes a surface profile corresponding to the cutout 88, and the adhesive agent 50 of uniform height can be applied to the outer peripheral surface 32b of the collar 30. Since provision of the projections 37A and 37B on the outer peripheral surface 32b of the collar 30 is not required, the structure of the collar 30 is simplified.

Thus, as the method of manufacturing the connecting shaft 100, it is possible, after the inner peripheral surface 20a of the second shaft 20 is fitted on the first region 16a of the serrations 16, to bring the first edge 86 of the spatula 85 having the first edge 86 and the cutout 88 cut out of the first edge 86 into contact with the outer peripheral surface 32b of the collar 30 and move the spatula 85 so as to circle it once around the outer peripheral surface of the collar 30 while keeping the spatula 85 in contact with the outer peripheral surface 32b of the collar 30, thereby filling the region AR2 between the cutout 88 of the spatula 85 and the outer peripheral surface 32b of the collar 30 with the adhesive agent 50 forced out beyond the axial direction end face 36 of the second fitting portion 32.

Figure 8A:
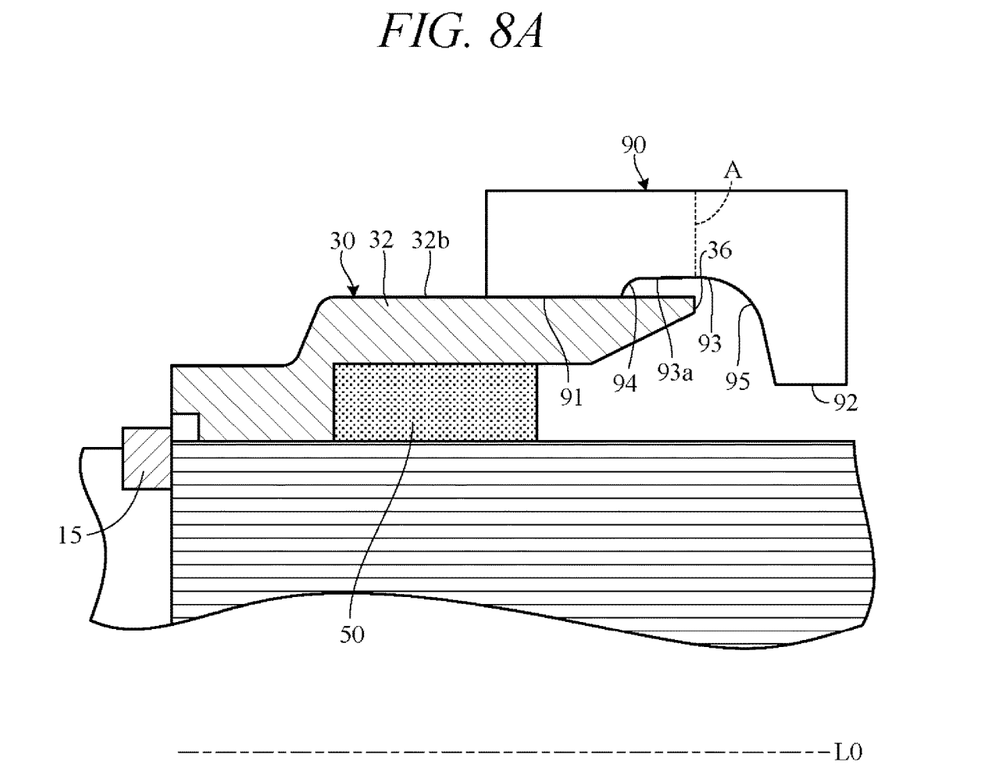
FIG. 8A is a first view showing a second modification of the manufacturing method of the connecting shaft according to the embodiment of the present invention.
Figure 8B:
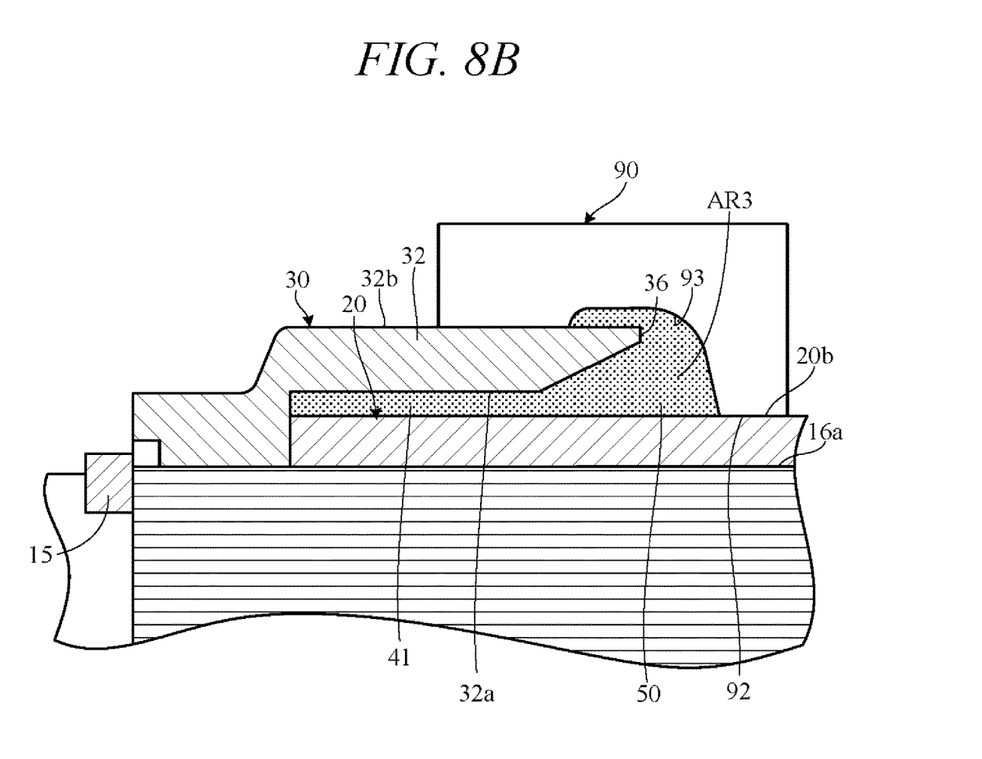
FIG. 8B is a second view showing the second modification of the manufacturing method of the connecting shaft according to the embodiment of the present invention.

FIGS. 8A and 8B are views showing a jig according to a second modification. This modification uses a pair of half-split jig 90 pieces of half-split shape (semicylindrical shape centered on the axis L0) which cover the end portion of the collar 30. Each half-split jig 90 piece has on one axial direction end a first inner peripheral surface 91 centered on the axis L0 and on another axial direction end a second inner peripheral surface 92 of smaller diameter than the first inner peripheral surface 91 also centered on the axis L0. Vertical distance between the first inner peripheral surface 91 and the second inner peripheral surface 92 corresponds to vertical distance between the outer peripheral surface 32b of the second fitting portion 32 of the collar 30 and the outer peripheral surface 20b of the second shaft 20. A recess 93 is formed between the first inner peripheral surface 91 and second inner peripheral surface 92.

The first inner peripheral surface 91, second inner peripheral surface 92 and recess 93 are each provided in the respective half-split jig 90 pieces to extend circumferentially 180°, but when the two jig 90 pieces are joined into a whole jig 90, each pair of first inner peripheral surfaces 91, second inner peripheral surfaces 92 and recesses 93 forms a cylindrical surface of 360°. Alternatively, the jig 90 pieces can be constituted by splitting a whole jig into two axial direction pieces rather than into two circumferential direction pieces. For example, a roughly cylindrical jig can be split along dotted line A in FIG. 8A into two axial direction jig 90 pieces. A bottom surface 93a of the recess 93 is formed parallel to the axis L0, and opposite axial direction end portions 94 and 95 of the recess 93 are formed toward the first inner peripheral surface 91 and second inner peripheral surface 92, respectively, to have arcuate or smoothly curved shapes. Since the half-split jig 90 pieces are formed with the recesses 93, the jig formed by joining them can also be used without need for projections 37A and 37B (FIG. 4) on the outer peripheral surface 32b of the collar 30.

The jig 90 is used as follows. Namely, in the state shown in FIG. 8A following the adhesive agent filling process and before the shaft press-fit process, the first inner peripheral surface 91 of the jig 90 is fitted on the outer peripheral surface 32b of the second fitting portion 32 of the collar 30 to install the jig 90 in a predetermined axial direction position relative to the collar 30. More specifically, the two half-split pieces of the jig 90 are set in place so that the end face 36 of the collar 30 is positioned inside the recess 93. Next, the second shaft 20 is press-fitted into the collar 30 as shown in FIG. 8B.

As a result, the adhesive agent 50 forced out beyond the end face 36 of the collar 30 is charged into a gap AR3 enclosed by the recess 93, the outer peripheral surface 20b of the second shaft 20 and the collar 30. The adhesive agent 50 can therefore be given a surface profile following the contour of the recess 93. In this modification, the adhesive agent 50 can be applied as far as onto the outer peripheral surface 32b of the collar 30 in the course of the second shaft 20 being press-fitted, thereby simplifying the adhesive agent 50 application process by eliminating need for troublesome work such as turning a spatula 80 or 85 around the collar 30.

Thus, as the method of manufacturing the connecting shaft 100, it is possible to set in place the divisible cylindrical jig 90 having the recess 93 (bottom surface 93a) facing the outer peripheral surface 32b of the collar 30 across the predetermined region AR3, and then, after the jig 90 is set in place, to fit the second shaft 20 onto the first region 16a of the serrations 16 and thereby fill the gap AR3 with the adhesive agent 50 forced out beyond the axial direction end face 36 of the second fitting portion 32.

The manufacturing method of the connecting shaft is not limited to that described in the foregoing insofar as it meets the requirement of filling a gap between the outer peripheral surface 20b of the second shaft 20 and the inner peripheral surface 32a of the second fitting portion 32 of the collar 30 with the adhesive agent 50 and applying the adhesive agent 50 up to the outer peripheral surface 32b of the collar 30 to cover the axial direction end face 36 of the second fitting portion 32. For example, it is alternatively possible to apply the adhesive agent 50 to the end portion of the outer peripheral surface 20b of the second shaft 20 in advance and fill the gap 41 between the second shaft 20 and the collar 30 with the adhesive agent 50 by press-fitting this second shaft 20 into the first shaft 10.

Although the connecting shaft 100 is used as a vehicle driveshaft in the aforesaid embodiment, the connecting shaft of the present invention can similarly be utilized as a propeller shaft or other shaft for transmitting torque. Moreover, the connecting shaft of the present invention is also usable in other non-vehicle applications (boats, for example).

The above embodiment can be combined as desired with one or more of the aforesaid modifications. The modifications can also be combined with one another.

According to the present invention, a gap between an outer peripheral surface of a second shaft and an inner peripheral surface of a second fitting portion of a collar is filled with an adhesive agent, and the adhesive agent is applied up to an outer peripheral surface of the collar to cover a end face of the second fitting portion in an axial direction. Therefore, since an interfacing edge is not present at a bonding region between the second shaft and the second fitting portion, intrusion of rust into the interfacing edge can be prevented.

Above, while the present invention has been described with reference to the preferred embodiments thereof, it will be understood, by those skilled in the art, that various changes and modifications may be made thereto without departing from the scope of the appended claims.

What is claimed is:

1. A connecting shaft, comprising:
    a first shaft made of metal, the first shaft including a serration formed on an outer peripheral surface at an end part thereof, the serration including a first region and a second region;
    a second shaft made of resin, the second shaft including an inner peripheral surface fitting on the first region of the serration at an end part thereof; and
    a collar made of metal, the collar including a first fitting portion fitting on the second region of the serration and a second fitting portion fitting on an outer peripheral surface of the second shaft,
    wherein a gap between the outer peripheral surface of the second shaft and an inner peripheral surface of the second fitting portion is filled with an adhesive agent,
    wherein the collar includes a projection projected radially outward from an outer peripheral surface of the collar over a whole circumference thereof, and
    wherein the adhesive agent is applied from the gap up to the outer peripheral surface of the collar between an end face of the second fitting portion in an axial direction and the projection to cover the end face of the second fitting portion.

2. The connecting shaft according to claim 1, wherein a diameter of an outer peripheral surface of the adhesive agent at the outer peripheral surface of the collar is equal to a diameter of the projection.

3. The connecting shaft according to claim 1, wherein the projection is a first projection, the collar includes a second projection projected radially outward from the outer peripheral surface of the collar over the whole circumference, and the second projection is axially between the first projection and the first fitting portion.

4. The connecting shaft according to claim 3, wherein an interfacing edge of the adhesive agent is located at a top of the first projection.

5. The connecting shaft according to claim 1, wherein an anticorrosion coating is applied from the outer peripheral surface of the collar to the outer peripheral surface of the second shaft to cover the adhesive agent applied up to the outer peripheral surface of the collar.

6. The connecting shaft according to claim 1, a diameter of an inner peripheral surface of the collar is expanded up to the end face of the second fitting portion.

* * * * *